US007061986B2

(12) United States Patent
Tonissen et al.

(10) Patent No.: US 7,061,986 B2
(45) Date of Patent: Jun. 13, 2006

(54) METHOD FOR ADAPTIVE BIT ASSIGNMENT AND FINE GAIN SETTING IN A MULTI-CARRIER COMMUNICATIONS SYSTEM

(75) Inventors: Shane Tonissen, Kensington (AU); Andrew Storm, Hawthorn (AU); Bryan Beresford-Smith, Clifton Hill (AU); David Wu, Mt. Waverly (AU)

(73) Assignee: Bandspeed, Inc., Austin, TX (US)

( * ) Notice: Subject to any disclaimer, the term of this patent is extended or adjusted under 35 U.S.C. 154(b) by 1003 days.

(21) Appl. No.: 10/057,053

(22) Filed: Jan. 25, 2002

(65) Prior Publication Data
US 2002/0131440 A1 Sep. 19, 2002

Related U.S. Application Data

(60) Provisional application No. 60/264,331, filed on Jan. 25, 2001.

(51) Int. Cl.
*H04K 1/10* (2006.01)

(52) U.S. Cl. .................................................. 375/260

(58) Field of Classification Search .............. 375/260, 375/267; 370/210, 484
See application file for complete search history.

(56) References Cited

U.S. PATENT DOCUMENTS

| 5,822,374 | A | 10/1998 | Levin |
| 5,903,608 | A * | 5/1999 | Chun .......................... 375/260 |
| 6,122,247 | A * | 9/2000 | Levin et al. ................ 370/210 |
| 6,128,348 | A | 10/2000 | Kao et al. |
| 6,134,274 | A | 10/2000 | Sankaranarayanan et al. |
| 6,292,515 | B1 * | 9/2001 | Kao et al. ................... 375/260 |
| 6,704,367 | B1 * | 3/2004 | Wang et al. ................ 375/260 |
| 6,829,307 | B1 * | 12/2004 | Hoo et al. ................... 375/260 |
| 2002/0044597 | A1 | 4/2002 | Shively et al. |

FOREIGN PATENT DOCUMENTS

| EP | 0 753 948 A1 | 1/1997 |
| WO | WO 99 16224 A1 | 4/1999 |

OTHER PUBLICATIONS

"A Practical Discrete Multitone Transceiver Loading Algorithm for Data Transmission over Spectrally Shaped Channels", Peter S. Chow, John M. Cioffi and John A.C. Bingham, IEEE Transactions on Communications, Feb./Apr. 1995, vol. 43, No. 2/4, part 2, p. 773-775.
PCT/US 02/02299 International Search Report, Jul. 23, 2002.
PCT/US 02/02294 International Search Report, Jul. 23, 2002.

* cited by examiner

*Primary Examiner*—Don N. Vo
(74) *Attorney, Agent, or Firm*—Hickman Palermo Truong & Becker, LLP; Edward A. Becker

(57) ABSTRACT

Bits are assigned to channels of a discrete modulation communications system. A first set of channels and a second set of channels are selected from a plurality of channels in the communications system. The first and second set of channels are selected in order to re-assign one or more bits from the first set of channels to the second set of channels so as to cause a performance characteristic of one or more channels in the communications system to improve.

15 Claims, 7 Drawing Sheets

METHOD FOR ADAPTIVE BIT ASSIGNMENT AND FINE GAIN SETTING IN A MULTI-CARRIER COMMUNICATIONS SYSTEM

RELATED APPLICATIONS

This application claims priority from U.S. Provisional Patent Application No. 60/264,331, entitled "A METHOD FOR ADAPTIVE BIT ASSIGNMENT AND FINE GAIN ADJUSTMENT IN A MULTI-CARRIER COMMUNICATIONS SYSTEM," filed Jan. 25, 2001, and naming Andrew Storm as inventor. The contents of the aforementioned priority application are hereby incorporated by reference in their entirety for all purposes.

FIELD OF THE INVENTION

The present invention relates to multi-carrier communications system, and more specifically, to an approach for adaptive bit assignment and fine gain setting in a multi-carrier communications system.

BACKGROUND OF THE INVENTION

There is a continuing need for higher performance digital data communications systems. Perhaps nowhere is this need more evident than on the worldwide packet data communications network now commonly referred to as the "Internet." On the Internet, the "richness" of content is constantly increasing, requiring an ever-increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

For several reasons, significant efforts are being made to utilize conventional twisted pair telephone lines to provide high-speed digital data transmission. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as ADSL, G.Lite and VDSL, have been developed for providing high-speed digital transmission over conventional twisted pair telephone lines.

Recent standards for digital subscriber line services such as ADSL and G.Lite use discrete multi-channel modulation (DMT) to implement multi-carrier communications systems. DMT is also under consideration for Very high speed Digital Subscriber Line (VDSL) services. By splitting the available bandwidth into a number of independently operating, narrow band channels (alternatively referred to as "tones") such systems achieve high performance over channels with widely varying spectral characteristics. Each channel effectively operates as a QAM system. The DMT transmitter splits the input data stream into a number of sub-streams, and encodes each sub-stream into a sequence of points in a QAM constellation. The maximum number of bits that may be assigned to each channel is determined by the prevailing signal to noise ratio (SNR) on that channel. In order to obtain equal bit error rates on all channels, provision is also made for fine adjustment of the transmit power. The need thus arises for methods that assign a number of bits to each channel, to either achieve a given total number of bits or to maximize the total number of bits, and to perform the fine gain adjustment.

Each channel of the multi-carrier system operates as a QAM (Quadrature Amplitude Modulation) system. In a QAM system with a constellation $C_b$ consisting of $2^b$ points at odd integer values (n, m), scaled by a factor d, and with additive Gaussian noise having power $\sigma^2$, the symbol error probability is given by $P_e=4Q(z)$ with $z=\sqrt{2}d/(\gamma\sigma)$. The number $\gamma$ is called the margin and the function Q is the tail area of the standard normal distribution:

$$Q(z) = \frac{1}{\sqrt{2\pi}} \int_z^\infty e^{-t^2/2} dt.$$

The margin operates as a guard when there is uncertainty about the operating conditions. If the system is required to operate at a symbol error probability $P_e$ with a margin of $\gamma^2$, then the error probability should be $P_e$ when the noise power is a factor $\gamma^2$ higher than its actual level. In addition, the constellation power is $$p = 2^{-b} d^2 \sum_{C_b} (n^2 + m^2) = \frac{2}{3} d^2 c(b).$$

The shape of the constellation determines the function c(b): typically $c(b)=\alpha_b 2^b - 1$. For example, if b is even, $c(b)=2^b-1$ for a square constellation with $2^b$ points. Eliminating d yields $$\frac{z^2 \gamma^2}{3} c(b) = \frac{p}{\sigma^2} = SNR.$$

This rearranges as $$c(b) = \frac{SNR}{\Gamma}.$$

The quantity $\Gamma=z^2\gamma^2/3$ is called the SNR gap. In the presence of coding, the SNR gap (or equivalently, the margin) is reduced by the amount of the coding gain.

Given an operating margin and a desired symbol error probability, one determines a value for z and thus for $\Gamma$. For example, if $P_e=10^{-7}$ and $\gamma=6$ dB then z=5.45 and $\Gamma=6+9.96=15.96$ dB in the absence of coding. Given a value for the SNR and the SNR gap, one obtains a value for the number of bits that may be transmitted on the channel by inverting c(b)=SNR/Γ and rounding b down to the nearest integer. This function may be conveniently implemented in a lookup table.

Determining b in this way yields the maximum number of bits that can be transmitted on the channel without fine gain adjustment. If an additional gain g is applied at the transmitter, and the SNR is measured without taking account of the gain, then in linear scale $$g^2 \frac{SNR}{\Gamma} = c(b).$$

Alternatively, in logarithmic scale $$g+SNR-\Gamma=c(b).$$

Given values for the number of bits b and the gain g, this equation determines the value of the SNR gap and thus the probability of a symbol error.

Conventional approaches attempt to minimize the variation in the probability of error across channels. This would be a trivial task if the gain on each channel could be arbitrarily chosen. However, system power constraints limit the aggregate gain across all channels, and communications standards sometimes impose further constraints on the individual gains. There may also be constraints on the number of bits. For example, there may be a minimum and a maximum value specified for the number of bits on each channel, and the total number of bits may be constrained to be a multiple of eight if information is transmitted in bytes. Also, a telecommunications provider may sell a service at a rate much less than the carrying capacity of the channel. In this case the total number of bits is specified in advance. Based on the foregoing, it is desirable to adaptively assign bits and gains to channels to minimize variations in margins between channels.

SUMMARY OF THE INVENTION

According to one embodiment of the invention, bits are assigned to channels of a discrete modulation communications system. A first set of channels and a second set of channels are selected from a plurality of channels in the communications system. Each set of channels may include one or more channels. The first and second set of channels are selected in order to re-assign one or more bits from the first set of channels to the second set of channels so as to cause a performance characteristic of one or more channels in the communications system to improve.

According to another embodiment, bits are assigned to channels of a discrete modulation communications system. One or more bits from a first channel in the plurality of channels are re-assigned to a second channel, and a first gain from the first channel is allocated to the second channel, in response to a determination (i) that a difference between a performance characteristic of the first channel and of the second channel will be reduced, and (ii) that re-assigning the one or more bits from the first channel to the second channel satisfies a bit constraint of the communications system.

In an embodiment, a second determination may be as to whether re-assigning a second gain from the first channel to the second channel will (i) reduce a difference between a performance characteristic of the first channel and of the second channel, and (ii)satisfy a gain constraint of the communications system. The second gain may be re-assigned from the first channel to the second channel in response to making the determination, without re-assigning a bit on the first channel or on the second channel.

BRIEF DESCRIPTION OF THE DRAWINGS

Embodiments are illustrated by way of example, and not by way of limitation, in the figures of the accompanying drawings and in which like reference numerals refer to similar elements.

FIG. 5 is a block diagram that depicts a computer system upon which an embodiment of the invention may be implemented.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects of the invention are described hereinafter in the following sections: 1.0 Overview; 2.0 Search State Determination; 3.0 Worst and Best Margin Bit/Gain Allocation Processes; 4.0 Unbalanced Margin Bit/Gain Allocation Process; 5.0 Communication System For Adaptive Bit Assignment and Fine Gain Value Assignment; and 6.0 Implementation Systems.

1.0 Overview

Embodiments of the invention provide for adjusting the bit and gain allocations on each channel of a communications system for purpose of improving a performance characteristic of one or more channels in the communications system. The adjustment to the bit and gain allocations may be done to cause average the performance characteristic between two or more channels to be averaged. In one embodiment, the adjustment to the bit and gain allocations may reduce a difference between the best margin and the worst margin of two or more channels in the communications system.

As used herein, the term set refers to one or more.

A multi-carrier communications system may have active channels, inactive channels, and dormant channels. Active channels are assumed to always carry data, unless the channel fails. The purpose of the dormant channels is to serve as possible carriers of data during operation. That is, during operation channels may be moved between the active and dormant channels. Inactive channels are those that are unworthy for data carriage. As such, inactive channels carry no data and have zero gain.

The signal to noise ratio on channel k is $SNR_k$. This is assumed to be an actual measured SNR. The method of measuring the SNR is not described here. It is assumed that the SNR does not include the fine gain factor.

The minimum number of bits that may be carried on an active channel is $b_{min}$, and the maximum number is $b_{max}$, where $0 < b_{min} < b_{max}$. An inactive channel is indicated by $b_k = 0$.

The minimum value of the gain on an active channel is $g_{min}$, and the maximum value is $g_{max}$, where $0 < g_{min} < 1 < g_{max}$. The gain on an inactive channel may be set to 0.

Certain embodiments of the invention may be described in terms of mathematical operations, with some suggested implementations. Use of mathematical operations is intended to be exemplary and separate from many concepts of the invention.

2.0 Search State Determination

Figure 1:
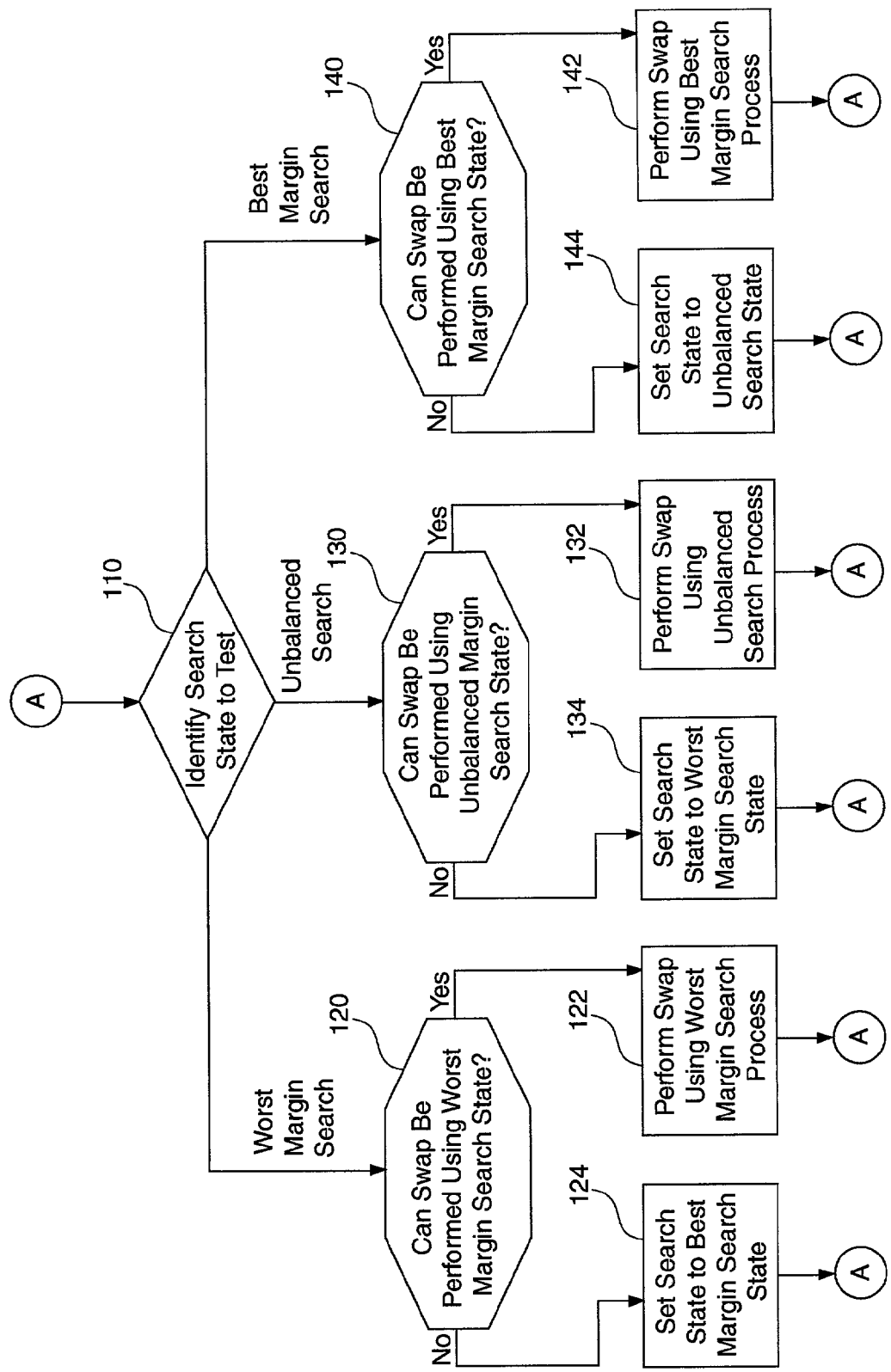
FIG. 1 illustrates a method for adaptive bit assignment and fine gain adjustment in a multi-carrier communications system, under an embodiment of the invention.

FIG. 1 illustrates a method for adaptive bit assignment and fine gain adjustment in a multi-carrier communications system, under an embodiment of the invention. According to one embodiment, changing bit assignments and fine gain adjustments are continuously performed in order to compensate for changes in the communications system while it is in operation.

In step 110, a search state for testing a bit and gain allocation is identified. Each search state refers to a process in which pairs of channels in the communications system are selected for bit re-assignment and gain adjustment, or alternatively for gain-only adjustment. In one embodiment, three processes are used together. A worst margin process performs a bit and/or gain swap between the channel with the worst margin in the communications system and one of n possible channels having the best margins in the communications system. A best margin process performs a bit and/or gain swap between the channel with the best margin in the communications system and one of n possible channels having the worst margins in the communications system. An unbalanced search performs a transfer gain from a channel with a high gain to a channel with a low gain.

In one embodiment, only one of the three processes is used at any one time to compare and adjust the bit and/or gain assignments. The process in use selects a pair of channels for a bit and/or gain assignment. The particular pair of channels selected depends on the process in use.

The determination of which process to use in step 110 may be made based on one of two factors. If the method described is being initiated, then one of the processes is designated to be the starting process. In an embodiment, the worst margin search process is designated to be the starting process because it arranges for more poor channels to be adjusted (by bit and/or by gain) in order to improve the performance characteristic of those channels. If the method described is in progress, then the last process executed determines the next process. One process may be executed until all pairs of channels that can be adjusted using that process are in fact adjusted. Then the process is complete.

Once a process is complete, the process may transition to another process. The processes may be implemented in a particular order. For example, one embodiment provides that a worst margin search is performed, next a best margin search, an unbalanced search, and then repeat beginning with the worst margin search.

Referring to FIG. 1, if the determination in step 110 is that a worst margin search state exists, then step 120 provides that another determination is made as to whether a swap can be performed using the worst margin search state. If the determination step 120 is positive, then the conclusion is that at least one pair of channels exists in the communications channels that satisfy the conditions for making bit and/or gain swaps using the worst margin search state. Step 122 then provides that a bit and gain swap, or a gain-only swap, is performed using the worst margin search state. Then step 110 is repeated, with the search state designated as the worst margin search state.

If the determination in step 120 is negative, then the conclusion is that no pairs of channels exist where a bit and/or gain adjustment can be made using the worst margin process. Next, step 124 provides that the search state is set to the best margin state. Then step 110 is repeated, with the search state designated as the best margin search state.

If the determination in step 110 is that the search state is the unbalanced search state, then step 130 makes a determination as to whether a gain swap can be performed using the unbalanced search state. If the determination in step 130 is positive, step 132 provides that a gain swap is performed using the unbalanced search state. The search state remains as the unbalanced search state. The method is then repeated with step 110.

If the determination in step 130 is negative, then the conclusion is that there are no pairs of channels in which a gain swap can be accomplished using the unbalanced search state. Step 134 provides that the search state is set to the worst margin search state. Then the method is repeated, beginning with step 110.

If the determination in step 110 is that a best margin search state exists, then step 140 provides that another determination is made as to whether a bit and gain swap, or a gain-only swap, can be performed using the best margin search case. If the determination step 140 is positive, then the conclusion is that at least one pair of channels exists in the communications channels that satisfy the conditions for making bit and/or gain swaps using the best margin process. Step 142 then provides that a swap (bit and/or gain) is performed using the best margin search state. Then step 110 is repeated, with the search state designated as the best margin search state.

If the determination in step 140 is negative, then the conclusion is that no pairs of channels exist where a bit and/or gain adjustment can be made using the best margin search process. Next, step 144 provides that the search state is set to the unbalanced search state. Then step 110 is repeated, with the search state designated as the unbalanced search state.

As stated, a method as described with FIG. 1 may be continuously repeated over a time duration, at least until desired margin levels are reached. A method such as described with FIG. 1 may also be initiated if, for example, changes to the communications system or its channels require bit re-assignment and fine gain adjustment.

3.0 Worst and Best Margin Bit/Gain Allocation Processes

Figure 2A:
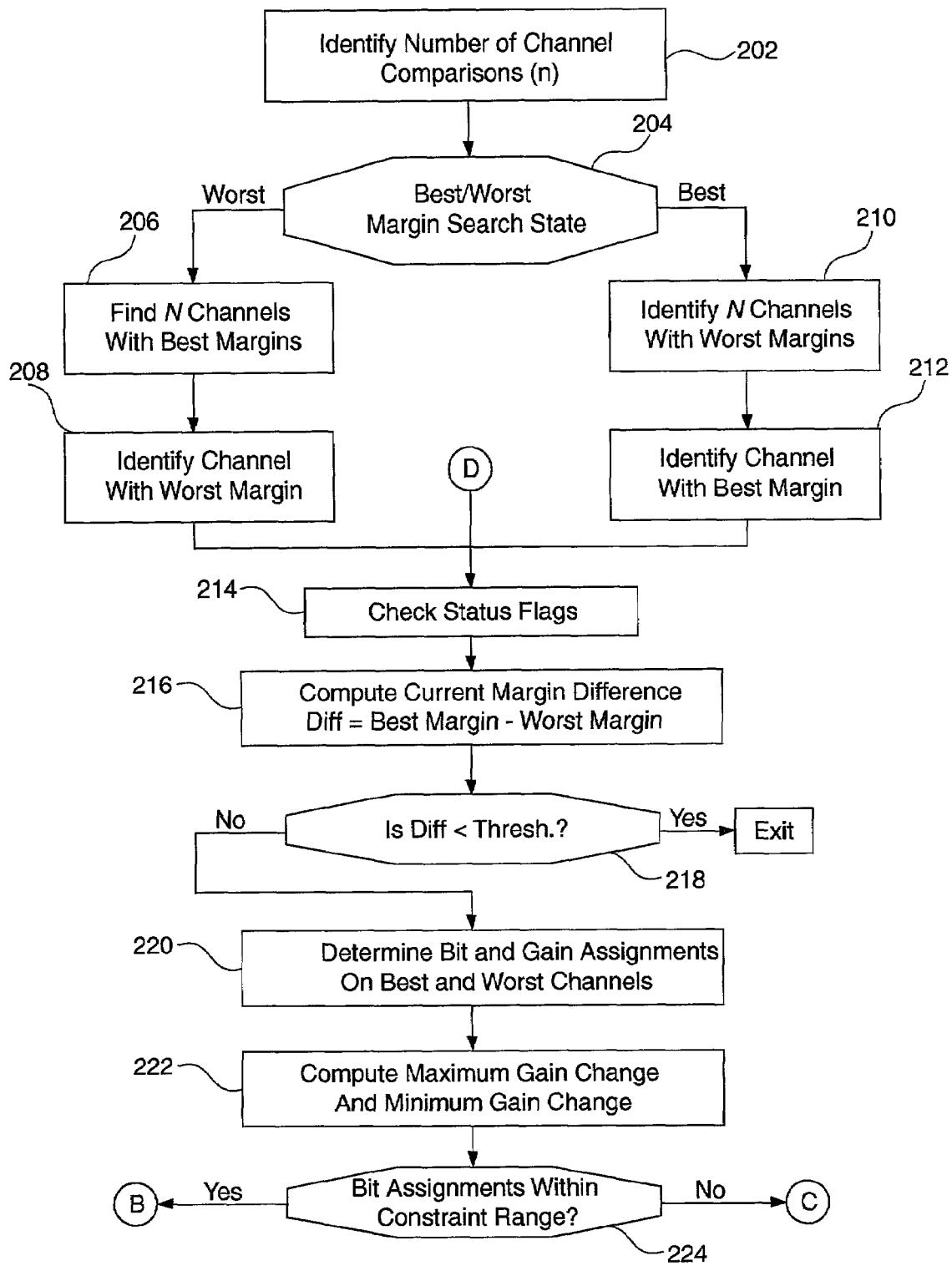
FIGS. 2A–2C illustrate a method for identifying and implanting best and worst margin type swaps for adaptive bit assignments and fine gain settings, under an embodiment.
Figure 2B:
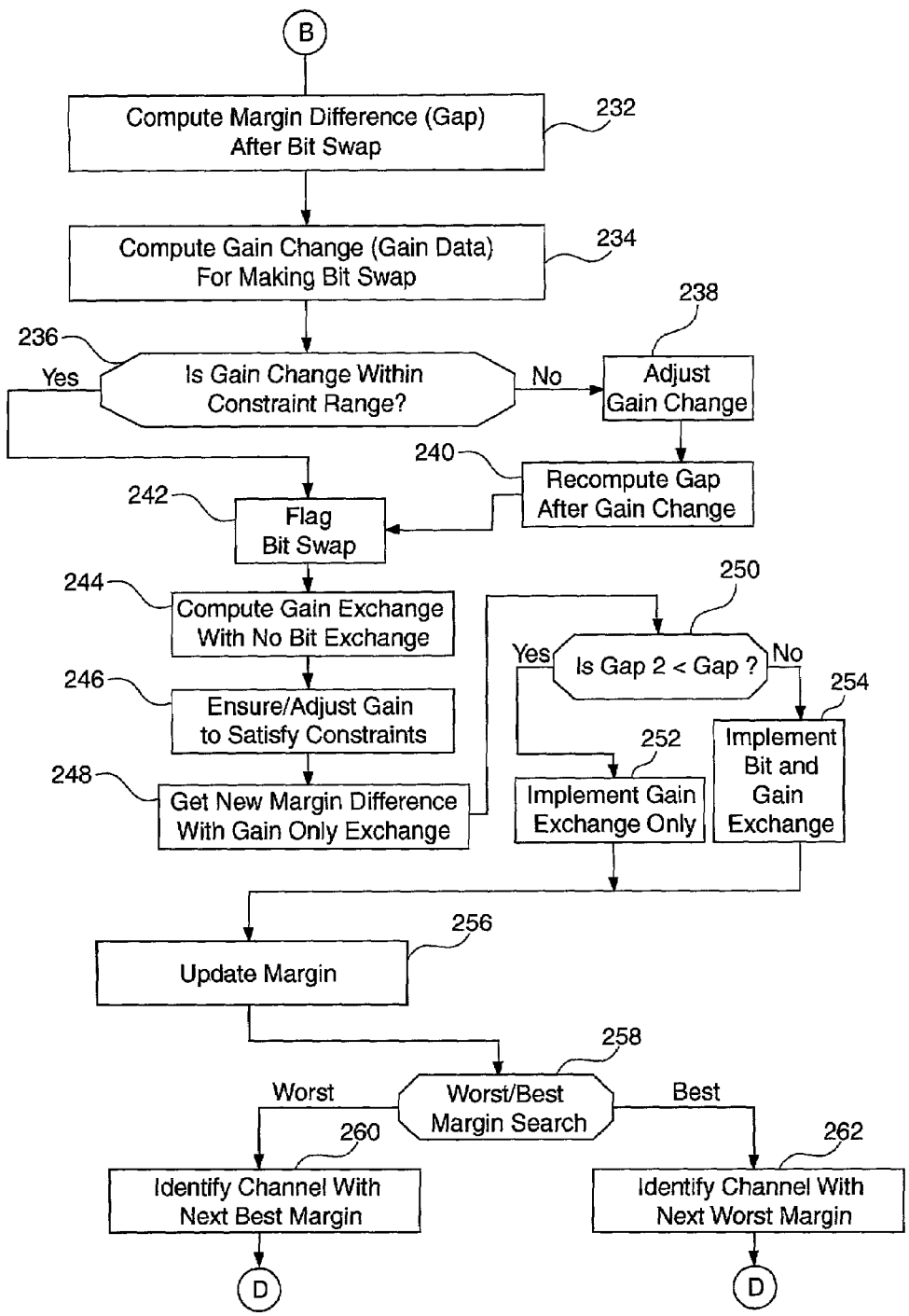
Figure 2C:
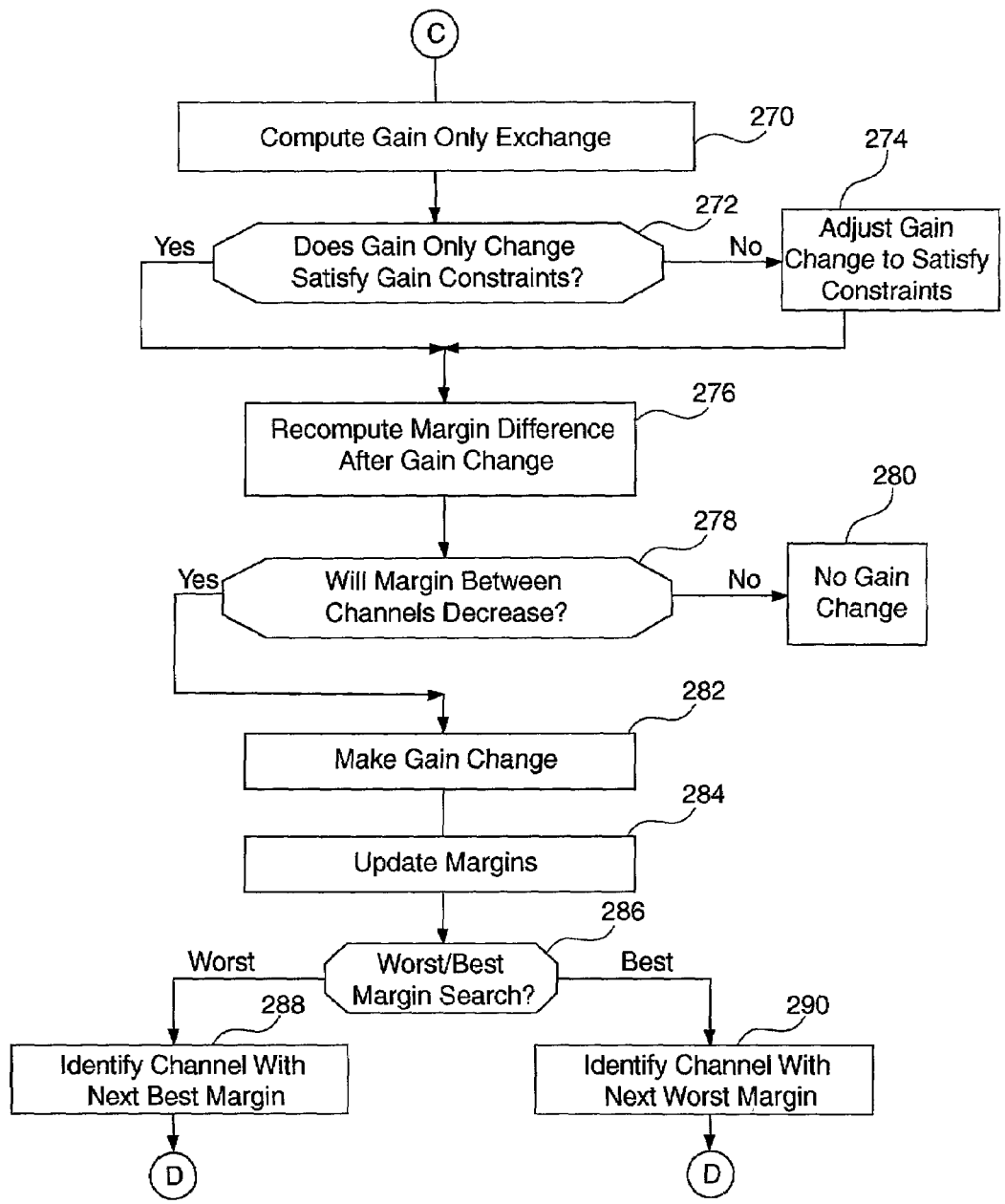

FIGS. 2A–2C illustrate a method for identifying and implanting best and worst margin type swaps for adaptive bit assignments and fine gain settings, under an embodiment. Portions of the worst margin search and the best margin search may be shared or similar to one another.

FIG. 2A illustrates initial steps for performing either a worst margin or best margin process for adjusting bits and/or gain to channels of a communications system. Prior to executing a method as described with FIG. 2, variables used in the method are initialized. In one embodiment, a flag ("bSwapFound") that indicates whether a bit swap using either the worst or best margin search process is feasible.

The value of this variable after the method is executed indicates whether the worst/best margin search processes should be performed. Another flag ("bSearchComplete") indicates whether all channels selected for the particular search state (referred below as n) have been checked. In addition, minimum permissible gain change parameters ("MinGainDelta") and maximum permissible gain change parameters ("MaxGainDelta") are identified in order to determine at later steps whether gain swaps should be performed. An index parameter ("index") is initialized and keeps track of the channels being compared.

In step 202, a number of channels n are identified for making a comparison. This value may be the result of user-input. The number of channels n will be compared with the channel with the worst margin if the search state is the worst margin search state. Similarly, the number of channels n will be compared with the channel with the best margin if the search state is the best margin search state.

In step 204, a decision is made as to whether the search state is the worst margin or the best margin search state. As mentioned with FIG. 1, this decision may be known based on the search state specified with the previous execution of bit and/or gain adjustment. Alternatively, the search state may be determined based on a priority or order of execution. For example, the worst search state process may be executed before the best search state process in order to maximize the efficiency of the communications system.

If the determination of step 204 is that it the method is in the worst search state, step 206 provides that N channels are identified with the best margins. Step 208 provides that the channel with the worst margin in the communications system is identified.

If the determination of step 204 is that it the method is in the best search state, step 210 provides that N channels are identified with the worst margins. Step 212 provides that the channel with the best margin in the communications system is identified.

Steps 214–224 are the same for the worst search state and the best search state. Step 214 provides that the flag is checked. In one implementation, the status flag correspond to bSearchComplete and bSwapFound. If in step 214, either of the two flags is true, the value of bSwapFound is returned. The bSwapFound will differ in value from its initial value if the method in FIGS. 2A and 2B can allow a bit and gain or gain-only swap to be performed in a manner that satisfies constraints on the communications system, while reducing margin differences between two communication channels. This bSwapFound value is what is detected in steps 120 and 140.

In step 216, a difference between the best and worst margins is determined. This difference may be identified by:

$$\text{Diff} = \text{BestMargin} - \text{WorstMargin} \quad \text{Equation (1)}$$

In Equation (1), BestMargin is the best margin value of all the channels identified in steps 206 and 208, or in steps 210 and 212. WorstMargin is the worst margin value of all the channels identified in steps 206 and 208, or in steps 210 and 212.

In step 218, another determination is made as to whether the margin difference Diff is less than a threshold amount. If the determination is positive, the procedure exits. This step safeguards from making a bit or gain swap with no measurable benefit to the margin of any channel in the system. The threshold amount may be a design parameter, or specified by the user.

In step 220, the bit and gain assignments existing on the best and worst channels are identified. In one embodiment, values for four variables are obtained: (1) the number of bits ("WorstBits") of the channel identified in steps 206 and 208, or in 210 and 212, as having the worst margin; (2) the number of bits ("BestBits") of the channel identified in steps 206 and 208, or in 210 and 212, as having the best margin; (3) the gain value ("WorstGain") of the channel identified in steps 206 and 208, or in 210 and 212, as having the worst margin; and (4) the gain value ("BestGain") of the channel identified in steps 206 and 208, or in 210 and 212, as having the best margin.

In step 222, the maximum gain change ("MaxGainChange") and the minimum gain change ("MinGainChange") are computed based on bit and gain assignments identified from step 220. MaxGainChange may be determined from the following equations:

$$\text{MaxGainChange} = \text{floor}(\text{MaxGain} + \min(-\text{Worstgain}, \text{Bestgain})) \quad \text{Equation (2)}$$

$$\text{MinGainChange} = \text{ceil}(\text{MinGain} + \max(-\text{WorstGain}, \text{BestGain})) \quad \text{Equation (3)}$$

In Equation (2), MaxGain is equal to $g_{max}$, a gain constraint of the communications system. The term "floor" refers to the floor function, and the term "ceil" refers to the ceiling function. In Equation (3), MinGain is equal to $g_{min}$, another gain constraint of the communications system.

In step 224, a determination is made as to whether the current bit assignment are within bit assignment constraints of the communications system. Specifically, one embodiment provides that this determination is expressed by:

$$\text{WorstBits} > \text{MinBitsPerTone} \ \& \ \text{BestBits} < \text{MaxBitsPerTone} \quad \text{Equation (4)}$$

The terms "MinBitsPerTone" and "MaxBitsPerTone" refer to bit constraints $b_{min}$ and $b_{max}$. If determination provided by Equation(4) cannot be satisfied, then the implication is that bits cannot be added or subtracted from the pair of channels in question. Those channels would be carrying bits that are right at the bit constraint for the system.

If the determination in step 224 is false, meaning at least one of the channels is carrying bits right at the bit constraint, then the method attempts to do only a gain exchange between the pair of channels with no bit exchange. This process is illustrated in FIG. 2C.

If the determination in step 224 is true, then bits may be swapped between the two channels in question. The method will then determine as to whether a bit and gain exchange has a better outcome than a gain only exchange for the pair of channels. This process is illustrated in FIG. 2B.

FIG. 2B illustrates a process for implementing a bit and/or gain exchange, under an embodiment of the invention. According to one implementation, steps performed in FIG. 2B are applicable for the worst/best exchange once a determination (such as shown in step 224 of FIG. 2A) is made that bits can be exchanged between two communication channels. As described, step 232 of the process shown by FIG. 2B is intended to follow step 224 of the process shown in FIG. 2A.

In step 232, the margin difference (Gap) between the two communication channels is computed, should the bit swap actually take place. The following equation may apply:

$$\text{Gap} = \text{Diff} + c(\text{BestBits}) - c(\text{Bestbits}+1) - (c(\text{WorstBits}) - c(\text{WorstBits}-1)) \quad \text{Equation (5)}$$

Equation (5) is in log scale, and is application of the equation $g + \text{SNR} - \Gamma = c(b)$. Equation (5) assumes that the bit swap will take place by adding a bit to the channel having the best margin, and taking a bit from the channel having the worst margin. This will serve the purpose of reducing the margin on the best channel (carrying BestBits), and increasing the margin on the worst channel (carrying WorstBits) so that the margin of the two channels equalize towards one another.

In step 234, the change in gain (GainDelta) is calculated for when the bit swap occurs. This may be accomplished by averaging the difference of the margin between the two channels, while rounding up the margin. The following express may apply:

$$\text{GainDelta}=\text{floor}(\text{Gap}/2+\frac{1}{2}) \qquad \text{Equation (6)}$$

In step 236, a determination is made as to whether the computed gain change would be within the gain constraint range of the communications system.

If the determination in step 236 is negative, then step 238 provides that the gain change is re-computed so as to comply with the gain constraint of the communications system. Steps 236 and 238 may be performed using one set of expressions which compare and adjust the gain change:

$$\text{GainDelta}=\min(\text{GainDelta}, \text{MaxGainDelta})$$

$$\text{GainDelta}=\max(\text{GainDelta}, \text{MinGainDelta})$$

$$\text{GainDelta}=\min(\text{GainDelta}, \text{MaxGainChange})$$

$$\text{GainDelta}=\max(\text{GainDelta}, \text{MinGainChange}) \qquad \text{Equations (7)}$$

Step 240 provides that the margin difference after the gain change is recomputed to account for the gain change, should the bits be exchanged between the two channels. The following expression may be used to recomputed the margin difference:

$$\text{Gap}=\text{Gap}-2\text{GainDelta} \qquad \text{Equation (8)}$$

If the determination in step 236 is negative, then no gain adjustment is necessary. Prior to step 242, no bit or gain exchange is conducted. The determinations and computations are made on the assumption that the bit swap and accompanying gain exchange took place.

Following either step 236 or step 240, step 242 provides that the bit swap flag is triggered. The difference in margins between the two channels before the bit swap is greater than the difference in margin between the two channels after the bit swap. The variable bSwapFound is set when |Gap|<|Diff|. This indicates that the bit swap and accompanying gain exchange is feasible between the two communication channels. That is, no gain or bit constraints are tripped in making the bit exchange between the two channels. Furthermore, the margin is determined to improve on at least one of the communications channels involved in the swap.

In steps 244–250, a determination is made as to whether a pure gain exchange is better than the bit swap and gain exchange. That is, the determination is made as to whether the margins of the two channels being compared may be equalized even more if only a gain exchange is conducted, rather than a bit and gain exchange.

Accordingly, in step 244, the gain change to the channels may be calculated using the following expression:

$$\text{GainDelta2}=\text{floor}(\text{Diff}/2+\frac{1}{2}) \qquad \text{Equation (9)}$$

In step 246, the gain constraints on the communications system are determined and possibly adjusted so as to satisfy gain constraints after making the gain exchange. Accordingly, the following equations may be implemented in order to determine whether making a gain-only exchange is better than a bit and gain exchange for equalizing the margins:

$$\text{GainDelta2}=\min(\text{GainDelta2}, \text{MaxGainDelta})$$

$$\text{GainDelta2}=\min(\text{GainDelta2}, \text{MaxGainChange})$$

$$\text{GainDelta2}=\max(\text{GainDelta2}, \text{MinGainChange}) \qquad \text{Equations (10)}$$

As shown by the Equations (10), the gain change to the channels is adjusted, if necessary, so as to meet the gain constraints on the communications system.

In step 248, a new margin (Gap2) is computed based on making a gain exchange, without making a bit exchange. In step 250, a determination is made as to whether the gain-only exchange equalized the margins of the two communications channels better than the bit and gain exchange. In other words, a determination is made as to whether Gap2<Gap.

If the determination in step 250 is that Gap2<Gap, step 252 provides that the gain-only exchange is made between the two channels. If the determination in step 250 is that Gap<Gap2, then step 254 provides that a bit and gain exchange is implemented between the channels. Following either step 252 or step 254, the margins are updated for the two channels in step 256.

In step 258, a determination is made again as to whether the worst margin or best margin swap is being performed. If worst margin swap is being performed, step 260 provides that the channel with the next best margin is identified from the selected n channels. Following step 260, the method as recited in FIG. 2A–2B is repeated, at the portion beginning with step 214. The index of n channels selected in step 206 is iterated so that the channel with the next biggest margin selected. The flag bSearchComplete for indicating completion of the process is set to reflect the change in the index of n channels where the next best channel has been selected.

If best margin swap is being performed, step 262 provides that the channel with the next worst margin is identified from the selected n channels. Following step 260, the method as recited in FIG. 2A–2B is repeated, at the portion beginning with step 214. The index of n channels selected in step 210 is iterated so that the channel with the next worst margin selected. The flag bSearchComplete for indicating completion of the process is set to reflect the change in the index of n channels where the next worst channel has been selected.

The worst margin swap and best margin swap processes are complete when one of two conditions are satisfied. Either a swap is performed, or the worst/best margin swap is iterated through the set of n channels selected in steps 206 or 210 with no swap performed. In the first case, once it is determined that a swap can be performed, the bSwapFound flag is made "TRUE" (or otherwise made the opposite of its initial value). In the second case, bSearchComplete is set to a value (i.e. "TRUE") indicating that all n channels selected in steps 206 and 210 have been checked and no swap was found to be feasible or possible.

In an implementation described with FIGS. 2A and 2B, the bSwapFound and bSearchComplete flags are returned to step 214. For example, if the worst margin search state exists, then bSwapFound will return a TRUE value only if a bit and gain, or gain-only swap between two channels identified in that method is determined to improve margins between the two channels without violating the constraints. Otherwise, once all the channels in step 206 are checked, bSearchComplete will return a value of TRUE, but bSwapFound will have a value of FALSE. In a method such as described with FIG. 1, the determination of step 120 would be based on the value of bSwapFound. If bSwapFound is TRUE, step 122 follows step 120. If bSwapFound is FALSE, step 124 follows step 120.

Similarly, if all the channels in step 210 are checked when the best margin search state exists, and bSwapFound remains FALSE, then step 140 in FIG. 1 would be followed by step 144. If in the best margin search, bSwapFound returns a TRUE value, then step 142 would follow step 140.

FIG. 2C illustrates a process for implementing a gain-only exchange, under an embodiment of the invention. According to one implementation, the gain-only exchange may be implemented after determining that a bit exchange would violate bit constraints (as described step 224 of FIG. 2A).

Step 270 may follow step 224 of FIG. 2A. In step 270, a gain-only change is computed for the channels being compared. The following relationship may be used:

$$\text{GainDelta}=\text{floor}(\text{Diff}/2+\frac{1}{2}) \quad \text{Equation (11)}$$

This expression states the gain change would be approximately one half the difference in gain on the two communication channels.

In step 272, a determination is made as to whether the gain-only exchange satisfies the gain constraints of the communications system. If the determination in step 272 is that the gain constraints are not satisfied, step 274 provides that the gain change is adjusted to satisfy the gain constraints on the communications system. Steps 272 and 274 may be implemented simultaneously using Equations (7).

Following steps 272 and 274, step 276 provides that the margin difference is recomputed should the gain-only exchange take place. The following equation may be used to compute the margin should the gain-only exchange take place:

$$\text{Gap2}=\text{Diff}-2\text{GainDelta} \quad \text{Equation (12)}$$

In step 278, a determination is made as to whether the gain-only exchange would improve the margin difference between the communication channels if the new margin difference is less than the margin difference between the communications channel prior to the gain-only exchange. This determination may be represented by the expression:

$$|\text{Gap2}|<|\text{Diff}|. \quad \text{Equation (13)}$$

If the determination in this step is that the margin difference between the communications channel is not improved, step 280 provides that no gain change is to take place.

Otherwise, if the determination in step 278 is positive, then step 282 provides that the gain change is made. In one implementation, variable bSwapFound is triggered TRUE when |Gap2|<|Diff|.

Step 284 provides that the margins are updated after the gain-only exchange.

Next, step 286 makes a determination as to whether the worst or best margin exchange is being performed. Steps 288 and 290 parallel steps 260 and 262. Following steps 288 or 290, the method is repeated at step 214, in FIG. 2A.

4.0 Unbalacned Margin Bit/Gain Allocation Process

Figure 3:
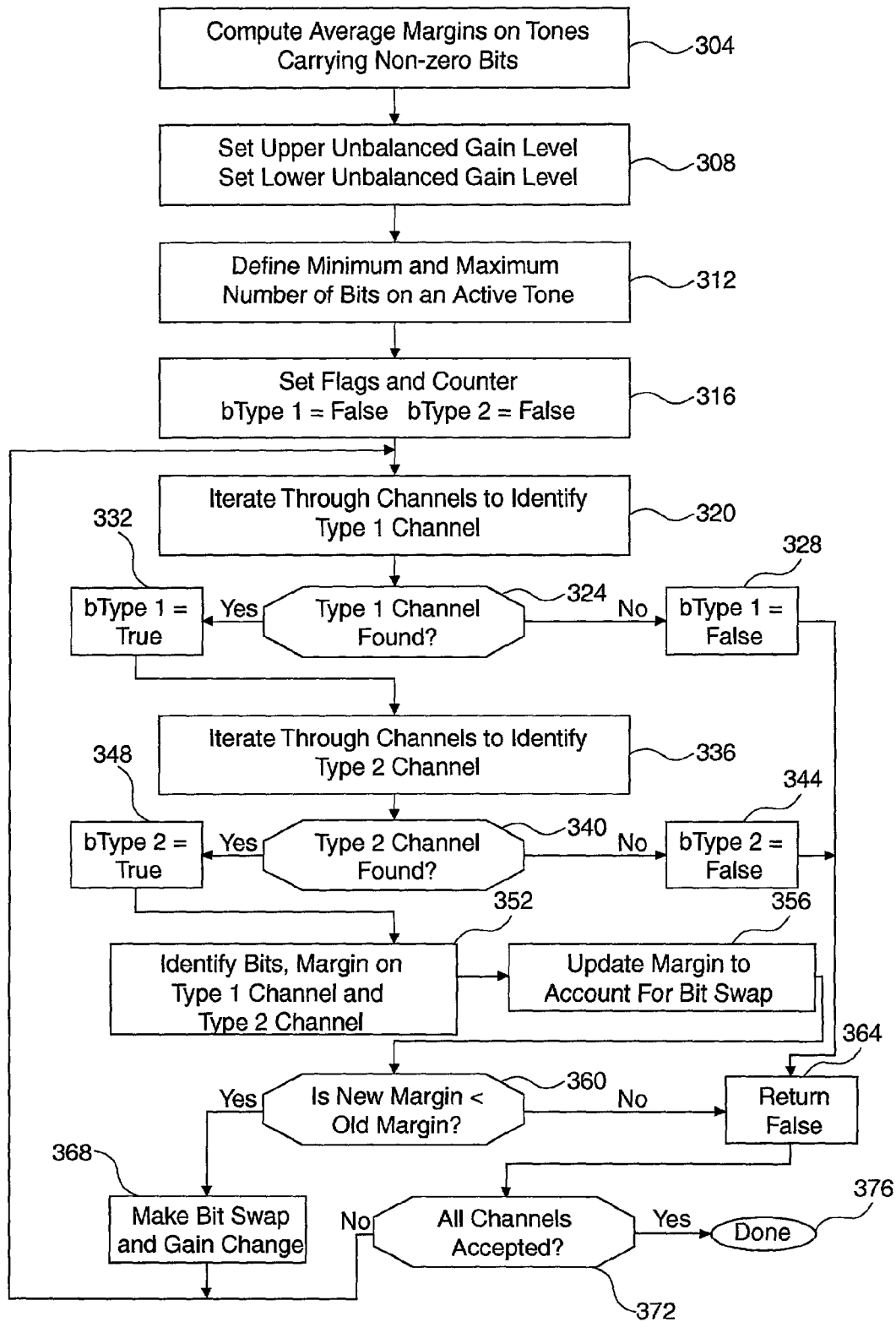
FIG. 3 illustrates a method for performing the unbalanced search and swap, under an embodiment of the invention.

FIG. 3 illustrates a method for performing the unbalanced search and swap, under an embodiment of the invention. Steps in FIG. 3 may be performed as a result of a determination in step 110 (FIG. 1) that the search state is "unbalanced".

In step 304, the average margins on channels carrying non-zero bits is computed. Step 308 provides that the upper unbalanced gain level and the lower unbalanced gain level is set. These levels may be dictated by thresholds of the standard being employed, or by capabilities of the communication channels and/or equipment. Alternatively, these levels may be user-specified. In one implementation, the upper unbalanced gain is defined as 1.5 dB. The lower unbalanced gain is defined as −1.5 dB.

In step 312, the minimum and maximum number of bits on any of the active channels is defined.

In step 316, initial flag and index variables are set for executing the method. Among other functions, the flag variables return information for search state information. These flag variables may initially be set as bType1=FALSE, bType2=FALSE.

In step 320, the active channels of the communications system are iterated through in order to determine if a Type 1 channel exists. The Type 1 channel corresponds to a channel having a gain value equal to the upper unbalanced gain limit. The iterations may be performed by tracking the index variable, and iterating the index variable to identify active channels in the communications system sequentially.

In step 324, a determination is made as to whether a Type 1 channel was identified in the communications channels. In one embodiment, the determination in step 324 requires three separate determinations. First, the gain of the identified channel is determined to exceed the upper unbalanced gain level. Second, the bits carried on the identified channel exceed the minimum number of bits defined in step 312. Third, the margin of the identified channel is determined to be less than the average margin, minus some threshold value, as shown by the following equation:

$$\text{margin[channel]}<(\text{average margin of all channels})-0.5 \quad \text{Equation (14)}$$

In the expression provided above, the threshold may be a design or user-specified parameter. The value 0.5 is used for this example.

If the determination in step 324 is negative, then step 328 provides that flag variable bType1 is returned with the value FALSE. If the determination in step 324 is positive, then step 332 provides that the flag variable bType2 is TRUE.

Steps 336–348 repeat the steps 320–332 for another communication channel that satisfies the lower unbalanced gain level. In step 336, the active channels of the communications system are iterated through for a channel that qualifies as a Type 2 channel. The Type 2 channel corresponds to a channel having a gain value equal to the lower unbalanced gain level. The iterations may be performed by tracking the index variable, and iterating the index variable to identify active channels in the communications system sequentially.

In step 336, a determination is made as to whether a Type 2 channel was identified in the communications channels. In one embodiment, the determination in step 336 requires three separate determinations. First, the gain of the identified channel is determined to be less than the lower unbalanced gain level. Second, the bits carried on the identified channel are less than the maximum number of bits defined in step 312. Third, the margin of the identified channel is determined to be greater than the average margin, plus some threshold value, as shown by the following equation:

$$\text{margin[channel]}>(\text{average margin of all channels})-0.5 \quad \text{Equation (15)}$$

If the determination in step 336 is that the Type 2 channel was not found in the active channels of the communications system, step 344 provides that the flag variable Type 2=FALSE. If the Type 2 channel was identified, step 348 provides that the variable bType2=TRUE.

Step 352 provides that the bits and the margin of the identified Type 1 and Type 2 channel are determined.

Next, in step 356, the margin is updated to account for a bit swap between the two channels. This margins may be updated using the following:

$$\text{NewMargin1} = \text{Margin1} + c(\text{Type1Bits}) + c(\text{Type1Bits}-1)-2$$

$$\text{NewMargin2} = \text{Margin2} + c(\text{Type2Bits}) + c(\text{Type2Bits}-1)+2 \quad \text{Equations (16)}$$

As shown by Equations (16), the margin is computed using the assumption that one bit will be subtracted from the Type 1 channel and added to the Type 2 channel.

In step 360, a determination is made as to whether the new margin is better than the old margin. This determination may be made through the following expression:

$$\min(\text{NewMargin1}, \text{NewMargin2}) > \min(\text{Margin1}, \text{Margin2}) \quad \text{Equation (17)}$$

If the determination in step 360 is not true, a FALSE value is returned in step 364. This indicates that no bit swap should be performed, because no improvement in margin would result.

If the determination in step 360 is positive, then step 368 performs the bit swap. The identified Type 1 channel loses a bit and some gain. The Type 2 channel gains a bit and some gain. The gain lost and gained by the Type 1 and Type 2 channels is set to be 2 dB, although other amounts of gain could be exchanged.

Step 368 is followed by step 320, which repeats the process given the bit swap made to the communication channels. If after step 364, the FALSE value is returned again, the method is done.

In an embodiment, once one of the flag variables, bType 1 or bType 2 is returned a value FALSE, the determination is made that the search state should be switched to worst margin.

Figure 4:
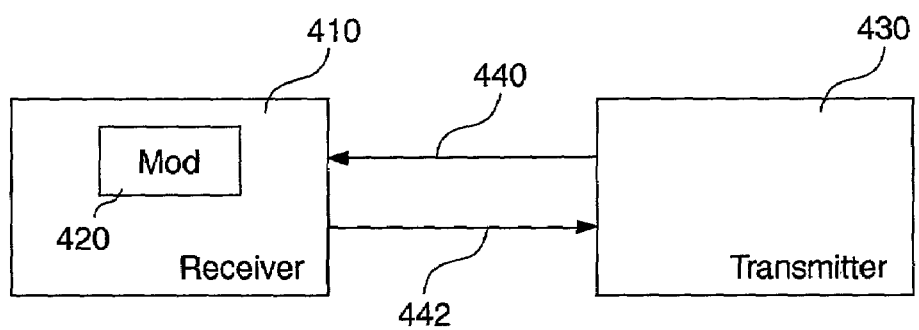
FIG. 4 illustrates a communications system for adaptively assigning bits and gain, under an embodiment of the invention.

5.0 Communication System for Adapative Bit assignment and Fine Gain Value Assignment FIG. 4 illustrates a communications system for adaptively assigning bits and gain, under an embodiment of the invention. In an embodiment, FIG. 4 illustrates discrete multi-channel modulation communications system, such as provided by DSL services. Specific examples of such systems include ADSL and G.Lite services.

Figure 5:
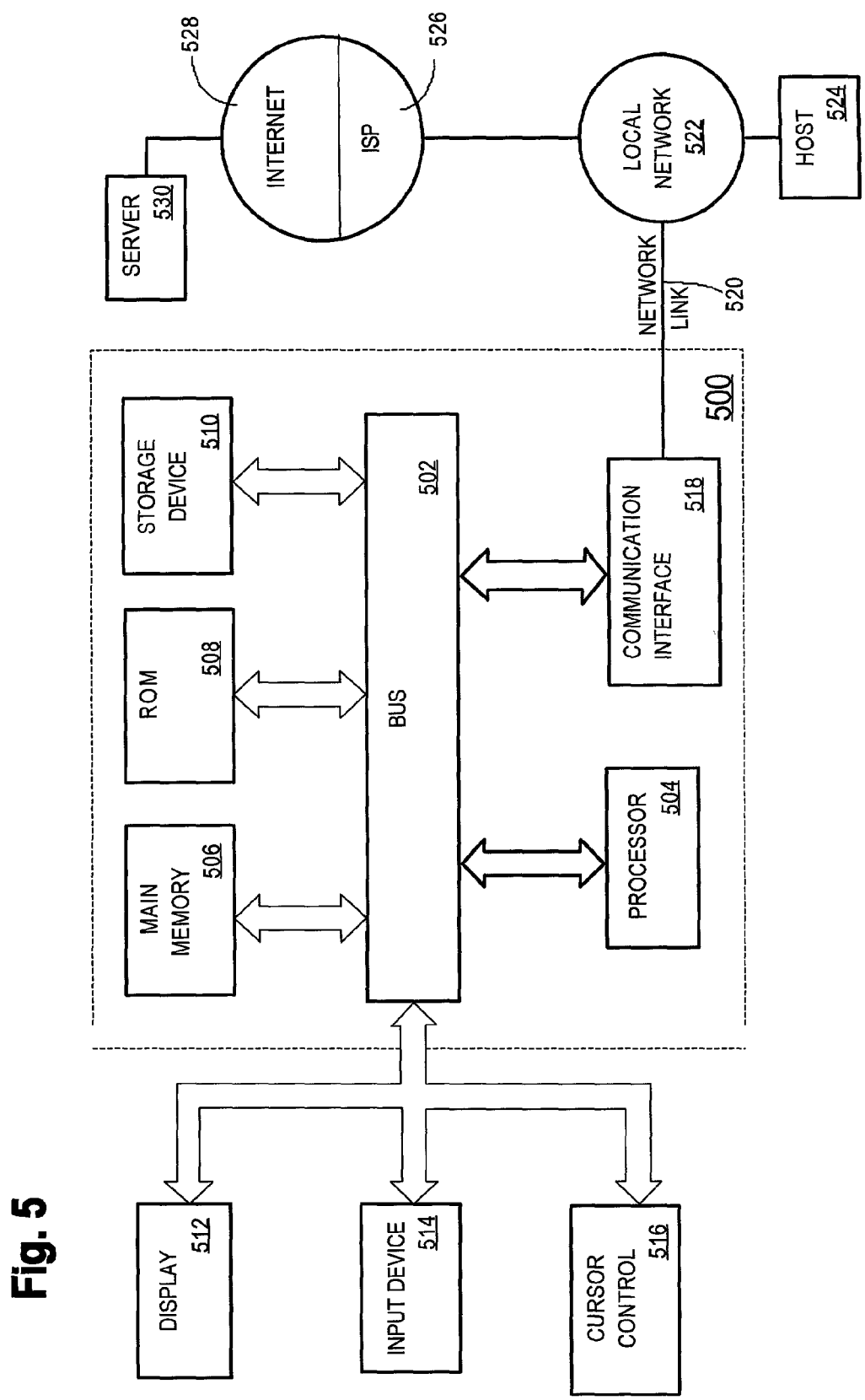
FIG. 5 illustrates a communications system for adaptive bit and fine gain value

As shown by FIG. 4, a communications system 400 includes a receiver 410 coupled to a transmitter 430 via a communication medium 440. The components of system 400 are shown in FIG. 5 for illustrative purposes. In actuality, the communications system 400 may include several transmitters and receivers and other components.

The communication medium 440 may carry discrete, multi-channel modulation signals, as used in DSL communications systems. Typically, the communication medium 440 includes a set of twisted-pair telephone wires. The communication medium may include a control channel 442 to forward control instructions and information from the receiver 410 to the transmitter 430. In this way, the receiver obtains information about data coming from transmitter 430, and can then configure the transmitter accordingly.

In an embodiment, receiver 410 includes a control module 420 for making determinations and implementations on adaptive bit assignment and fine gain setting. As used herein, a module may include a program, a subroutine, a portion of a program, a software component or a hardware component capable of performing a stated task or function. A module can exist on a hardware component such as a server independently of other modules, or a module can exist with other modules on the same server or client terminal, or within the same program. The control module 420 may implement methods and processes described with FIGS. 1–3 in order to make adaptive bit and fine gain assignments, as described with embodiments of the invention.

The control module 420 may be implemented external to receiver 410, such as on a stand-alone computer that interfaces with the receiver. Alternatively, control module 420 may be incorporated into the transmitter 430, either partially or entirely.

6.0 Implementation Systems

The approach for assigning bits and fine gain values to channels of a discrete, multi-channel modulation communications system may be implemented in a wide variety of network types and contexts.

FIG. 5 is a block diagram that depicts a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 608 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 602 to a display 612, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Embodiments of the invention relate to the use of computer system 500 for adaptively assigning bits and fine gain values to channels of a discrete, multi-channel modulation communications system. According to one embodiment, adaptively assigning bits and fine gain values to channels of a discrete, multi-channel modulation communications system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 6522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 618. In accordance with the invention, one such downloaded application provides for assigning bits and fine gain values to channels of a discrete, multi-channel modulation communications system as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for adaptively assigning bits to channels of a discrete multi-channel modulation communications system, the method comprising:
   re-assigning one or more bits from a first channel in a plurality of channels to a second channel in the plurality of channels, and re-assigning a first gain from the first channel to the second channel, if (i) a difference between a performance characteristic of the first channel and of the second channel will be reduced, and (ii) re-assigning the one or more bits from the first channel to the second channel will satisfy a bit constraint of the communications system; else
   making a determination as to whether re-assigning a second gain from the first channel to the second channel will (i) reduce a difference between a performance characteristic of the first channel and of the second channel, and (ii)satisfy a gain constraint of the communications system.

2. A method as recited in claim 1, further comprising re-assigning one or more bits from the first channel to the second channel if a difference in a margin of the first channel and of the second channel will be reduced.

3. A method as recited in 1, further comprising re-assigning the second gain from the first channel to the second channel in response to making the determination, without re-assigning a bit on the first channel or on the second channel.

4. A method as recited in 1, further comprising selecting the first channel and the second channel based on the first channel having a margin value that is less than a lower threshold value, and the second channel having a margin value that exceeds an upper threshold value.

5. A method as recited in 1, further comprising selecting the first channel and the second channel based on the first channel having a gain level that is less than a lower threshold value, and the second channel having a gain level exceeding an upper threshold value.

6. A computer-readable medium for adaptively assigning bits to channels of a discrete multi-channel modulation communications system, the computer-readable medium carrying instructions for performing the steps of:
   re-assigning one or more bits from a first channel in a plurality of channels to a second channel in the plurality of channels, and re-assigning a first gain from the first channel to the second channel, if (i) a difference between a performance characteristic of the first channel and of the second channel will be reduced, and (ii) re-assigning the one or more bits from the first channel to the second channel will satisfy a bit constraint of the communications system; else making a determination as to whether re-assigning a second gain from the first channel to the second channel will (i) reduce a difference between a performance characteristic of the first channel and of the second channel, and (ii)satisfy a gain constraint of the communications system.

7. A computer-readable medium as recited in claim 6, further carrying instructions for re-assigning one or more bits from the first channel to the second channel if a difference in a margin of the first channel and of the second channel will be reduced.

8. A computer-readable medium as recited in claim 6, further carrying instructions for re-assigning the second gain from the first channel to the second channel in response to making the determination, without re-assigning a bit on the first channel or on the second channel.

9. A computer-readable medium as recited in claim 6, further carrying instructions for selecting the first channel and the second channel based on the first channel having a margin value that is less than a lower threshold value, and the second channel having a margin value that exceeds an upper threshold value.

10. A computer-readable medium as recited in claim 6, further carrying instructions for selecting the first channel and the second channel based on the first channel having a gain level that is less than a lower threshold value, and the second channel having a gain level exceeding an upper threshold value.

11. An apparatus for adaptively assigning bits to channels of a discrete multi-channel modulation communications system, the apparatus being configured to:

re-assign one or more bits from a first channel in a plurality of channels to a second channel in the plurality of channels, and re-assigning a first gain from the first channel to the second channel, if (i) a difference between a performance characteristic of the first channel and of the second channel will be reduced, and (ii) re-assigning the one or more bits from the first channel to the second channel will satisfy a bit constraint of the communications system; else make a determination as to whether re-assigning a second gain from the first channel to the second channel will (i) reduce a difference between a performance characteristic of the first channel and of the second channel, and (ii)satisfy a gain constraint of the communications system.

12. A method as recited in claim 11, wherein the apparatus is further configured to re-assign one or more bits from the first channel to the second channel if a difference in a margin of the first channel and of the second channel will be reduced.

13. A method as recited in 11, wherein the apparatus is further configured to re-assign the second gain from the first channel to the second channel in response to making the determination, without re-assigning a bit on the first channel or on the second channel.

14. A method as recited in claim 11, wherein the apparatus is further configured to select the first channel and the second channel based on the first channel having a margin value that is less than a lower threshold value, and the second channel having a margin value that exceeds an upper threshold value.

15. A method as recited in claim 11, wherein the apparatus is further configured to select the first channel and the second channel based on the first channel having a gain level that is less than a lower threshold value, and the second channel having a gain level exceeding an upper threshold value.

* * * * *

UNITED STATES PATENT AND TRADEMARK OFFICE
CERTIFICATE OF CORRECTION

| | | |
|---|---|---|
| PATENT NO. | : 7,061,986 B2 | Page 1 of 1 |
| APPLICATION NO. | : 10/057053 | |
| DATED | : June 13, 2006 | |
| INVENTOR(S) | : Shane Tonissen et al. | |

It is certified that error appears in the above-identified patent and that said Letters Patent is hereby corrected as shown below:

In Claim 3: Col. 16, line 44,

After "A method as recited in", insert --Claim--.

In Claim 4: Col. 16, line 49,

After "A method as recited in", insert --Claim--.

In Claim 5: Col. 16, line 54,

After "A method as recited in", insert --Claim--.

In Claim 13: Col. 18, line 20,

After "A method as recited in", insert --Claim--.

In Claim 14: Col. 18, line 26,

After "A method as recited in", insert --Claim--.

In Claim 15: Col. 18, line 31,

After "A method as recited in", insert --Claim--.

Signed and Sealed this

Twenty-sixth Day of December, 2006

JON W. DUDAS
*Director of the United States Patent and Trademark Office*